(12) United States Patent
Borloz et al.

(10) Patent No.: US 12,122,075 B2
(45) Date of Patent: Oct. 22, 2024

(54) CASTING METHOD TO CHECK A THICKNESS OF A CAST SHEET WITH A HEIGHT DETECTOR DISPOSED ON A SLIDER

(71) Applicant: PHILIP MORRIS PRODUCTS S.A., Neuchatel (CH)

(72) Inventors: Michel Borloz, Yvonnand (CH); Yann Richard, Grandevent (CH)

(73) Assignee: Philip Morris Products S.A., Neuchatel (CH)

( * ) Notice: Subject to any disclaimer, the term of this patent is extended or adjusted under 35 U.S.C. 154(b) by 0 days.

(21) Appl. No.: 17/698,620

(22) Filed: Mar. 18, 2022

(65) Prior Publication Data

US 2022/0203580 A1    Jun. 30, 2022

Related U.S. Application Data

(62) Division of application No. 16/302,729, filed as application No. PCT/EP2017/059038 on Apr. 13, 2017, now Pat. No. 11,312,044.

(30) Foreign Application Priority Data

May 31, 2016    (EP) .................................... 16172327

(51) Int. Cl.
*B29C 41/52*    (2006.01)
*A24B 3/14*    (2006.01)
(Continued)

(52) U.S. Cl.
CPC ................ *B29C 41/52* (2013.01); *A24B 3/14* (2013.01); *A24C 5/01* (2020.01); *B29C 41/28* (2013.01);
(Continued)

(58) Field of Classification Search
CPC ........... B29C 41/52; B29C 41/28; A24B 3/14; A24C 5/01; G01B 5/068; G01B 2210/42
See application file for complete search history.

(56) References Cited

U.S. PATENT DOCUMENTS 2,093,694 A    9/1937    Johnston
2,196,268 A    4/1940    Carsten
(Continued)

FOREIGN PATENT DOCUMENTS

DE    452881    2/1929
DE    102012220174    5/2014
(Continued)

OTHER PUBLICATIONS

WO-2016055859-A2 translation (Year: 2023).*
(Continued)

*Primary Examiner* — Jeffrey M Wollschlager
*Assistant Examiner* — Guy F Mongelli
(74) *Attorney, Agent, or Firm* — Mueting Raasch Group

(57) ABSTRACT

The invention relates to a casting apparatus for the production of a cast sheet of homogenized tobacco material, said casting system comprising
a casting box adapted to contain a slurry of the homogenized tobacco material;
a movable support;
a casting system adapted to deposit the slurry contained in the casting box onto the movable support so as to form the cast sheet;
a sensor to detect a thickness of the cast sheet;
wherein the sensor includes a slider comprising a planar surface adapted to be in contact to a top surface of the cast sheet and a height detector adapted to measure the height of the planar surface so as to derive the thickness of the cast sheet.

(Continued)

The invention also relates to a method to measure the thickness of a homogenized tobacco sheet.

13 Claims, 4 Drawing Sheets

(51) Int. Cl.
  *A24C 5/01* (2020.01)
  *B29C 41/28* (2006.01)
  *G01B 5/06* (2006.01)
(52) U.S. Cl.
  CPC .......... *G01B 5/068* (2013.01); *G01B 2210/42* (2013.01)

(56) References Cited

U.S. PATENT DOCUMENTS

| | | | | |
|---|---|---|---|---|
| 3,259,136 | A * | 7/1966 | Jansson | D21G 3/005 264/144 |
| 3,680,215 | A | 8/1972 | Plough | |
| 3,926,247 | A * | 12/1975 | Geiger | B22D 25/04 164/415 |
| 4,182,954 | A * | 1/1980 | Giles | G01N 23/02 250/359.1 |
| 4,702,264 | A * | 10/1987 | Graves, Jr. | A24B 3/14 131/370 |
| 5,352,108 | A | 10/1994 | Kagawa | |
| 5,697,385 | A * | 12/1997 | Seymour | A24B 3/14 131/354 |
| 5,747,675 | A | 5/1998 | Greminger | |
| 10,314,328 | B2 | 6/2019 | Soo | |
| 10,463,068 | B2 | 11/2019 | Soo | |
| 10,575,549 | B2 | 3/2020 | Soo | |
| 2003/0084938 | A1 | 5/2003 | Ellis | |
| 2003/0084996 | A1 * | 5/2003 | Alberg | B29C 43/28 156/509 |
| 2003/0085369 | A1 | 5/2003 | Ellis | |
| 2004/0122547 | A1 | 6/2004 | Seymour | |
| 2017/0303579 | A1 * | 10/2017 | Soo | A24B 3/14 |
| 2018/0186060 | A1 | 7/2018 | Li | |

FOREIGN PATENT DOCUMENTS

| | | | |
|---|---|---|---|
| EP | 0686470 | 12/1995 | |
| EP | 0825438 | 2/1998 | |
| EP | 0565360 | 6/2000 | |
| EP | 2881000 | 6/2015 | |
| WO | WO 2009/048606 | 4/2009 | |
| WO | WO 2015/110517 | 7/2015 | |
| WO | WO-2016055859 A2 * | 4/2016 | .......... B05C 11/026 |

OTHER PUBLICATIONS

CN-102040043-A translation (Year: 2023).*
KR-2014056219-A translation (Year: 2023).*
NZ-611743-A translation (Year: 2023).*
PCT Search Report and Written Opinion for PCT/EP2017/059038 dated Jun. 12, 2017 (13 pages).

* cited by examiner

CASTING METHOD TO CHECK A THICKNESS OF A CAST SHEET WITH A HEIGHT DETECTOR DISPOSED ON A SLIDER

This application is a divisional of U.S. application Ser. No. 16/302,729, filed Nov. 19, 2018 and which is a U.S. National Stage Application of International Application No. PCT/EP2017/059038 filed Apr. 13, 2017, which was published in English on Dec. 7, 2017, as International Publication No. WO 2017/207161 A1. International Application No. PCT/EP2017/059038 claims priority to European Application No. 16172327.5 filed May 31, 2016.

The present invention relates to an apparatus to cast a sheet of homogenized tobacco material and adapted to determine the thickness of the cast sheet, and to a method to determine the thickness of a cast sheet.

Today, in the manufacture of tobacco products, besides tobacco leaves, also homogenized tobacco material is used. This homogenized tobacco material is typically manufactured from parts of the tobacco plant that are less suited for the production of cut filler, like, for example, tobacco stems or tobacco dust. Typically, tobacco dust is created as a side product during the handling of the tobacco leaves during manufacture.

The most commonly used forms of homogenized tobacco material are reconstituted tobacco sheet and cast leaf. The process to form homogenized tobacco material sheets commonly comprises a step in which tobacco dust and a binder are mixed to form a slurry. The slurry is then used to create a tobacco web, for example by casting a viscous slurry onto a moving metal belt to produce so called cast leaf. Alternatively, a slurry with low viscosity and high water content can be used to create reconstituted tobacco in a process that resembles paper-making. Once prepared, homogenized tobacco webs or sheets may be cut in a similar fashion as whole leaf tobacco to produce tobacco cut filler suitable for cigarettes and other smoking articles. A process for making such homogenized tobacco is for example disclosed in European Patent EP 0565360.

In an aerosol-generating article, for example in an aerosol-generating article of the "heat-not-burn" type, an aerosol-forming substrate is heated to a relatively low temperature, in order to form an aerosol but prevent combustion of the tobacco material. Further, the tobacco present in the homogenized tobacco material is typically the only tobacco, or includes the majority of the tobacco, present in the homogenized tobacco material of such a aerosol-generating article. This means that the aerosol composition that is generated by such a "heat-not burn" aerosol-generating article is substantially only based on the homogenized tobacco material. Therefore it is important to have good control over the composition of the homogenized tobacco material, for the control for example, of the taste of the aerosol.

The thickness of the resulting cast sheet is a relevant parameter for the final product, that is, it may influence whether the final product—such as the aerosol-generating article—is within the desired specifications. For this reasons, the thickness of the cast sheet is preferably measured, and more preferably constantly monitored, after casting to reveal possible deviations from the desired thickness.

In order to measure the thickness of the cast sheet of homogenized tobacco material, it is known to use a wheel in contact with the top surface of the cast sheet. During measurement, due to the fact that the cast sheet is constantly moved and transported, the wheel rolls on the top surface of the cast sheet. The height of the wheel and its variations are checked, and from the wheel height the thickness of the cast sheet is derived. The derived thickness is then compared with a predefined preferred thickness of the cast sheet within an accepted tolerance.

However, it has been shown that tobacco dust or other impurities may accumulate on the wheel surface while in contact with the top surface of the cast sheet, as shown for example in FIG. 1. These particles or impurities 107 (depicted with a circle which remains attached to the surface of the wheel 105) may interfere with the correct evaluation of the thickness during the cast sheet 10 measurement. Indeed, the particle attached to the wheel surface has also a finite dimension, which could be considered by the system as a variation of the thickness of the cast sheet when the particle is again positioned between the cast sheet and the surface of the wheel (see FIG. 1 where the particle 107 is attached on the surface of the wheel and depicted in two different positions reached by the particle while the cast sheet 10 is moving along the moving direction depicted by arrow 40). Production interruptions are possibly needed in order to clean the surface of the wheel, with consequent reduction in productivity.

There is therefore a need for a new method and casting apparatus for preparing a cast sheet of homogenized tobacco material for the use in an aerosol-generating article where the thickness of the sheet can be reliably measured. Further, there is a need that the thickness measurement is fast and does not, or does only minimally, disrupt or interfere with production.

According to an aspect, the invention relates to a casting apparatus for the production of a cast sheet of homogenized tobacco material, the casting system comprising a casting box adapted to contain a slurry of the homogenized tobacco material, a movable support and a casting system adapted to deposit the slurry contained in the casting box onto the movable support so as to form the cast sheet. Further, the casting apparatus includes a sensor to detect a thickness of the cast sheet; wherein the sensor includes a slider comprising a planar surface adapted to be in contact to a top surface of the cast sheet and a height detector adapted to measure the height of the planar surface so as to derive the thickness of the cast sheet.

Homogenized tobacco materials are formed by mixing several ingredients with water to obtain a slurry. In a further step, a continuous web or sheet of homogenized material is created on a movable support by casting the slurry onto the support. It is desired that the resulting homogenized tobacco sheet has a good homogeneity, because deviations from a constant thickness may indicate the presence of defects. Therefore, thickness of the cast sheet is checked in order to determine whether a deviation from a nominal preferred thickness takes place.

The thickness of the cast web is not only relevant to detect the presence of defects. Thin webs may crack easily. Thick webs may easily develop agglomerates frequently. A constant homogeneous thickness throughout the whole sheet is also relevant in the drying process. After the casting, the sheet or web of homogenized tobacco material is preferably dried and the drying parameters depend, among others, on the thickness of the sheet or web. Therefore, a continuous control of the thickness of the sheet is preferred.

According to the invention, a slider is positioned on top of the upper surface of the cast sheet, that is, on top of the surface of the cast sheet which is not in contact to the movable support. The slider includes a planar surface, which is a surface with a curvature radius equal approximately to zero. The slider allows a determination of the thickness of the cast sheet by determining the height of a portion of the slider, such as the height of the surface of the slider in contact with the upper surface of the sheet. From this height of the planar surface, or of any other pre-determined part of the slider, the thickness of the cast sheet can be derived.

The planar surface remains in contact to the top surface of the cast sheet while the cast sheet is transported onto the movable support. In practice, the cast sheet is always preferably shifted so that the casting can be made continuously. On the other hand, preferably the slider remains still in its position, that is, it does not "follow" the cast sheet in its translation. Due to the relative movement between the cast sheet and the slider, a friction builds up: this friction is present between the moving top surface of the cast sheet and the planar surface of the slider which substantially remains still. The friction creates a constant "cleaning effect" of the planar surface of the slider due to the abrasion between the surfaces (top surface-planar surface) which are in contact. Due to the "cleaning effect", particles or debris are very unlikely stuck on the planar surface, therefore the need of manually cleaning the planar surface causing machine interruption becomes also very unlikely.

The term "homogenized tobacco material" is used throughout the specification to encompass any tobacco material formed by the agglomeration of particles of tobacco material. Sheets or webs of homogenized tobacco are formed in the present invention by agglomerating particulate tobacco obtained by grinding or otherwise powdering for example tobacco leaf lamina or tobacco leaf stems or blends thereof.

In addition, homogenized tobacco material may comprise a minor quantity of one or more of tobacco dust, tobacco fines, and other particulate tobacco by-products formed during the treating, handling and shipping of tobacco.

In the present invention, the slurry is preferably formed by tobacco lamina and stem of different tobacco types, which are properly blended. In this, the term "tobacco type" refers to one of the different varieties of tobacco. in three main groups of bright tobacco, dark tobacco and aromatic tobacco.

The slurry may comprise a number of different components or ingredients in addition to the tobacco. These components influence the homogenized tobacco material properties. A first ingredient is a tobacco powder blend, which preferably contains the majority of the tobacco present in the slurry. The tobacco powder blend is the source of the majority of tobacco in the homogenized tobacco material and thus gives the flavor to the final product, for example to an aerosol produced heating the homogenized tobacco material. A cellulose pulp containing cellulose fibers is preferably added to the slurry in order to increase the tensile strength of the tobacco material web, acting as a strengthening agent. A binder and an aerosol-former are preferably added as well, in order to enhance the tensile properties of the homogenized sheet and promote the formation of aerosol. Further, in order to reach a certain viscosity and moisture optimal for casting the web of homogenized tobacco material, water may be added to the slurry. The slurry is mixed in order to render it as homogeneous as possible.

The slurry is then collected in a casting box, in which a pre-defined amount of slurry is preferably maintained, for example a pre-determined level of slurry within the casting box is set. Preferably, slurry is continuously supplied to the casting box while the slurry is cast onto a movable support to form a continuous web of homogenized tobacco material. The slurry for example flows out the casting box from the bottom of the same by gravity. Additionally, means for an active transport within the casting box may be provided, like pushers or propellers. Preferably, the casting box forms a pressurized enclosure. In other words, a control over the pressure within the casting box can be made, so that the flow of slurry out of the box is additionally controlled by means of acting on the level of the internal pressure of the casting box. Preferably, the casting apparatus comprises a mixing device to mix the slurry inside the casting box. The slurry is then distributed onto the moving support, by any casting system.

The slurry is cast across the width of the moving support, through an exit of the casting box that is formed above the moving support. The support moves along a longitudinal direction in order to remove the slurry from the casting box. The support may include for example a stainless steel movable belt.

The casting blade has preferably a dominant dimension, which is its width, and it preferably extends along substantially the whole width of the casting box. Preferably, the width of the blade and the width of the casting box to which the blade is attached are similar.

After the slurry has been cast so that a sheet of homogenized tobacco material has been formed, according to the invention the thickness of such a sheet is determined. The sheet thickness may preferably vary between about 40 micron and about 1000 micron, preferably between about 85 micron and about 500 micron, more preferably between about 180 micron and about 250 micron.

In order to determine such thickness, a slider having a planar surface is put into contact with the top or upper surface of the cast sheet, that is, it is put into contact with the surface of the cast sheet which is opposite to the surface of the sheet in contact with the movable support. Being the cast sheet generally substantially planar, at least in the neighborhood of the location where the slider is positioned, there is a contact between the two surfaces which is preferably substantially as large as the area of the planar surface of the slider.

Preferably, in addition to the planar surface, in the following now called "first planar surface", the slider includes an additional planar surface, which is tilted with respect to the first planar surface. This additional planar surface forms advantageously an angle with the first planar surface larger than 90°, so that it faces the cast sheet without contact. Preferably, this additional planar surface is located upstream the first planar surface with respect to the direction of movement of the movable support. Preferably, the connection between the first planar surface and the additional planar surface is smooth, that is, a sharp angle is not formed, but rather a continuous curved surface connects the first planar surface to the additional planar surface so that the cast sheet is not exposed to sharp corners while moving and contacting the first planar surface and thus it is not damaged.

The first planar surface may be connected to the additional planar surface by means of an angle or by means of a rounded corner, that is, a curved shaped surface connects the two planar surfaces. The shape of the connection between the two planar surfaces may vary the degree of "stickiness" of the slider onto the cast sheet, that is, a control of the slider shape in the connection between the two planar surfaces may simplify the sliding of the slider onto the cast sheet.

The slider and the cast sheet are in relative movement one from the other. The slider is preferably still, that is, it is not in motion, while the cast sheet is moved by the movable support. However, the slider in some embodiment can be moved as well, as long as a relative movement between the slider and the cast sheet is also present. The relative movement between the slider and the cast sheet causes a continuous friction of the planar surface of the slider against the top surface of the cast sheet. This continuous rubbing of the two surfaces causes a self-cleaning effect on the planar surface itself, because any particle or dust which may be deposited on it is quickly removed by the rubbing and friction caused by the motion of the cast sheet.

The accumulation of particles on the planar surface of the slider is therefore prevented.

Preferably, the casting system includes a casting blade adapted to cast the slurry onto the movable support, a distance separating said casting blade from said support. A possible casting system uses a casting blade in order to cast the slurry onto the movable support. The casting blade is located above the support and a distance is present between the blade and the support. Preferably, this distance can be varied in order to vary the properties of the cast sheet.

Preferably, the casting system includes two casting rollers forming a gap therebetween, said gap being positioned below said casting box. A system including two rollers, substantially parallel one to the other, may be used as well. The two rollers form a gap therebetween. Preferably, the gap has a dimension which can be changed, in order to change properties of the cast sheet. The rollers may be metal rollers, preferably steel rollers. The rollers are located below an aperture formed in the casting box, so that the slurry is deposited on top of the casting rollers and flows into the gap formed between them. The slurry is "glued" onto the surface of one of the rollers and it is then deposited onto the moving support. Preferably the rollers rotate at a given speed, more preferably the speed is tunable.

Advantageously, a third casting roller is present, located below one of the two substantially parallel rollers, so that the slurry is deposited from one of the parallel rollers into the third roller and then onto the movable support. The third roller may be a rubber roller. The rotation speed of the substantially parallel rollers and the gap between the rollers defines the quantity of slurry that is collected by the rubber roller which is pressing against the steel rollers and the movable support. The steel belt is collecting the slurry from the rubber roller. With the differential speed of the rollers and the movable support it is possible to spread in an even manner the slurry.

Preferably, the casting apparatus includes a pressing device adapted to press said planar surface towards the cast sheet. Comparing the solution of the invention wherein a slider is used to a solution according to the prior art wherein a roller or wheel in contact with the top surface of the cast sheet is used to determine the thickness of the cast sheet, the following can be shown. For the same pressure value which allows a correct contact of the sensor to the top surface of the cast sheet, in case a slider is provided, the contact surface between the slider and the top surface of the cast sleeve is bigger than in case a wheel or cylinder is used as a thickness sensor. This is due to the fact that the wheel or cylinder contacts the top surface of the cast sheet substantially with a "line" (that is, a substantially one-dimensional contact), while the slider contacts the top surface of the cast sheet with substantially the whole area of its planar surface. This allows the slider to correctly remain in contact with the top surface of the cast sheet while exerting a relatively low strength per square centimeter on the cast sheet, decreasing the chances of possible damage to the cast sheet. Indeed, damages to the cast sheet could be created during the thickness measurement process if a high pressure per square centimeter is applied. A relatively low contact pressure is for example comprised between about 0.3 Newton and about 1 Newton per square centimeter.

The planar surface of the slider in contact to the top surface of the cast sheet has preferably a dimension comprised between about 0.25 square centimeters and about 60 square centimeters. Preferably, it is comprised between about 0.5 square centimeters and about 3 square centimeters.

Many different pressing devices can be used, such as a preloaded spring, or compressed air.

More preferably, the casting apparatus includes an air pressure generator and a nozzle, said nozzle being adapted to eject compressed air towards the slider so as to press said planar surface towards the movable support. More preferably, the casting apparatus comprises an air pressure regulator to vary a pressure value of the compressed air exiting the nozzle. The sensor is preferably pressed on the top surface of the cast sheet using compressed air. The value of the exerted pressure can be adjusted easily and accurately according to the type or kind of cast sheet measured. The compressed air technology, compared for example to spring compression, allows to finely tune the pressure value exerted on the cast sheet and to adapt this pressure value depending on the hardness and the type of cast sheet the thickness of which is to be measured. For example, details on the cast sheet can be inputted at the beginning of the thickness measuring step, allowing an inline very reactive adjustment of the pressure exerted by the slider.

Preferably, the casting apparatus comprises a plurality of sliders positioned one parallel to the others. More preferably, the plurality of sliders is positioned in a row formed perpendicularly to a direction of motion of the movable support. Several sliders according to the invention could be used to measure the thickness of the cast sheet. This allows to determine possible inhomogeneity of the cast sheet, because the thickness of it is measured in a plurality of positions. For example, if the thickness measured in an area where a first slider is located is different than the thickness in a different area where a second slider is located, it means that a thickness inhomogeneity is present. A plurality of sliders therefore allows measuring both the thickness of the cast sheet and its variations. The more the sliders present on the cast sheet, the bigger is the accuracy achieved to detect thickness variations. Advantageously, the sliders are aligned perpendicular to the cast sheet moving direction which is determined by the movable support, so that each slider measures the thickness of a portion of the width of the cast sheet.

More preferably, a distance between two adjacent sliders perpendicularly to the direction of motion of the movable support is comprised between about 0 centimeters and about 200 centimeters. The number of sliders and the distance between two contiguous sliders is related to and in accordance with the cast sheet width and to the desired accuracy in which inhomogeneity is to be determined. Preferably, the distance between two continuous sliders is kept constant within the plurality of sliders, that is, the distance between any two contiguous sliders in the plurality is the same. Preferably, each slider is located in a middle of a "segment", portion of the total width of the cast sheet, so that the sum of the segments is equal to the width of the cast sheet.

Preferably, the planar surface includes a rectangular surface. More preferably, a side of the rectangular surface is positioned perpendicular to a direction of motion of the movable support. A relatively simple geometry of the planar surface is preferably used, which allows to have at the same time a relatively large surface in contact to the top surface of the cast sheet.

Preferably, said height detector is adapted to measure the height of the planar surface with reference to the movable support. The thickness of the cast sheet may be measured by comparing a memorized height of the slider when in direct contact with the movable support and the height of the slider when in direct contact with the moving top surface of the cast sheet. The difference between the two measures gives the desired cast sheet thickness.

Preferably, the casting apparatus includes a drying unit, the slider being positioned downstream the drying unit, in the direction of motion of the movable support. Preferably, the moisture of said cast tobacco material web at casting is between about 60 percent and about 80 percent. Preferably, the homogenized tobacco sheet is dried by a drying unit after casting. Preferably, the moisture of said cast sheet at the end of the drying, for example at an outlet of the drying unit, is between about 7 percent and about 15 percent of dry weight of the tobacco material sheet. Therefore, a direct contact between the slider and the homogenized tobacco sheet immediately after casting could result in the formation of defects on the surface of the cast sheet where the contact takes place, due to the high moisture present in the cast sheet. After drying, the moisture in the cast sheet is highly reduced and the friction between the top surface of the cast sheet and the planar surface may not, or only minimally, damage the top surface of the cast sheet.

Preferably, the casting apparatus includes a control unit connected to the sensor, the control unit being adapted to determine variations in height of said slider on the basis of signals sent by the sensor. More preferably, the control unit is adapted to command actuators or motors in response to signals received from the sensor in order to perform a feedback loop to vary one or more of the parameters in the casting apparatus. Preferably, one or more feedback loops are present in the casting apparatus of the invention. The presence of defects, for example an inhomogeneity in the thickness of the cast sheet of homogenized tobacco material, which can be revealed by the sensor(s), implicitly indicates the presence of non-optimal casting conditions. These non-optimal casting conditions can be due to several factors, such as the density of the slurry outside of a preferred range, a non-uniform gap between the casting blade and the movable support across the width of the casting blade, a level of moisture in the slurry outside of a preferred moisture range and others. Therefore, advantageously, a control unit can determine whether there are variations in height of the sensor and preferably also perform a feedback loop, for example when the conditions of the casting would cause the production of cast sheet to be outside of the desired specifications. The central control unit may operate or command an actuator or motor in order to change the deviating process parameter or to modify one or more additional different parameters to correct the detected problem.

According to another aspect, the invention relates to a method to check a thickness of a cast sheet of a homogenized tobacco material, the method including: introducing a slurry of homogenized tobacco material in a casting box; depositing the slurry on a movable support forming a cast sheet; and putting a slider having a planar surface in contact to a top surface of the cast sheet. The method also comprises detecting a height of the planar surface of the slider, and deriving from the detected height a thickness of the cast sheet.

As discussed in relation to the first aspect, the measurement of the thickness of the cast sheet by means of the slider having a planar surface may have at least one of the following advantageous effects. The abrasion effect under the slider prevents dust or any other particle to stay stuck under the planar surface of the slider; errors in the thickness measurement are thus minimized. The relatively large surface of contact between the slider and the cast sheet, in particular when compared to a sensor having a wheel, decreases possible damage to the cast sheet when the slider is pressed on the cast sheet.

Preferably, the method includes pressing the planar surface against the top surface of the cast sheet. More preferably, said pressing is performed by applying pressurized air on the slider.

Preferably, the step of tuning said applied pressure value by the planar surface onto the upper surface of the cast sheet. More preferably, the value of said pressure in said tuning depends on parameters of the composition of the cast sheet. Advantageously, the amount of pressure is calibrated depending on the type of cast sheet.

Preferably, the casting of the slurry is performed by means of a casting blade, a distance between the casting blade and the movable support being changeable.

Preferably, the casting of the slurry is performed by means of two casting rollers, a gap between the two casting rollers being changeable.

Preferably, the method includes the steps of: preparing a slurry; detecting variations of the height of the slider; and changing parameters of the step of casting the slurry or in the step of preparing the slurry or in a step of processing the cast sheet if the detected variations are outside a pre-set interval. Advantageously, a feedback loop is present and parameters of the slurry composition or of the casting can be varied in order to counter balance variations in thickness which are outside the desired specifications. In this way, the amount of production which needs to be disregarded due to defects in the cast sheet is minimized.

More preferably, the step of changing parameters of the step of casting the slurry or in the step of preparing the slurry or in a step of processing the cast sheet includes one or more of: changing the gap between the casting rollers; changing the distance between the casting blade and the movable support; changing a speed of at least one of the casting rollers; changing a speed of the movable support; changing a drying profile of the cast sheet. The feedback loop preferably acts on one or more of these parameters in order to obtain the desired thickness of the cast sheet. An on-line feedback loop is preferred.

Preferably, the method of the invention includes the steps of: moving said movable support and said cast sheet along a transport direction, while keeping the slider substantially still. Advantageously, the slider does not move so that it is easier to detect its height.

Preferably, the method of the invention includes the steps of: drying the cast sheet; and detecting a height of the planar surface of the slider after drying.

Further advantages of the invention will become apparent from the detailed description thereof with no-limiting reference to the appended drawings.

Figure 2:
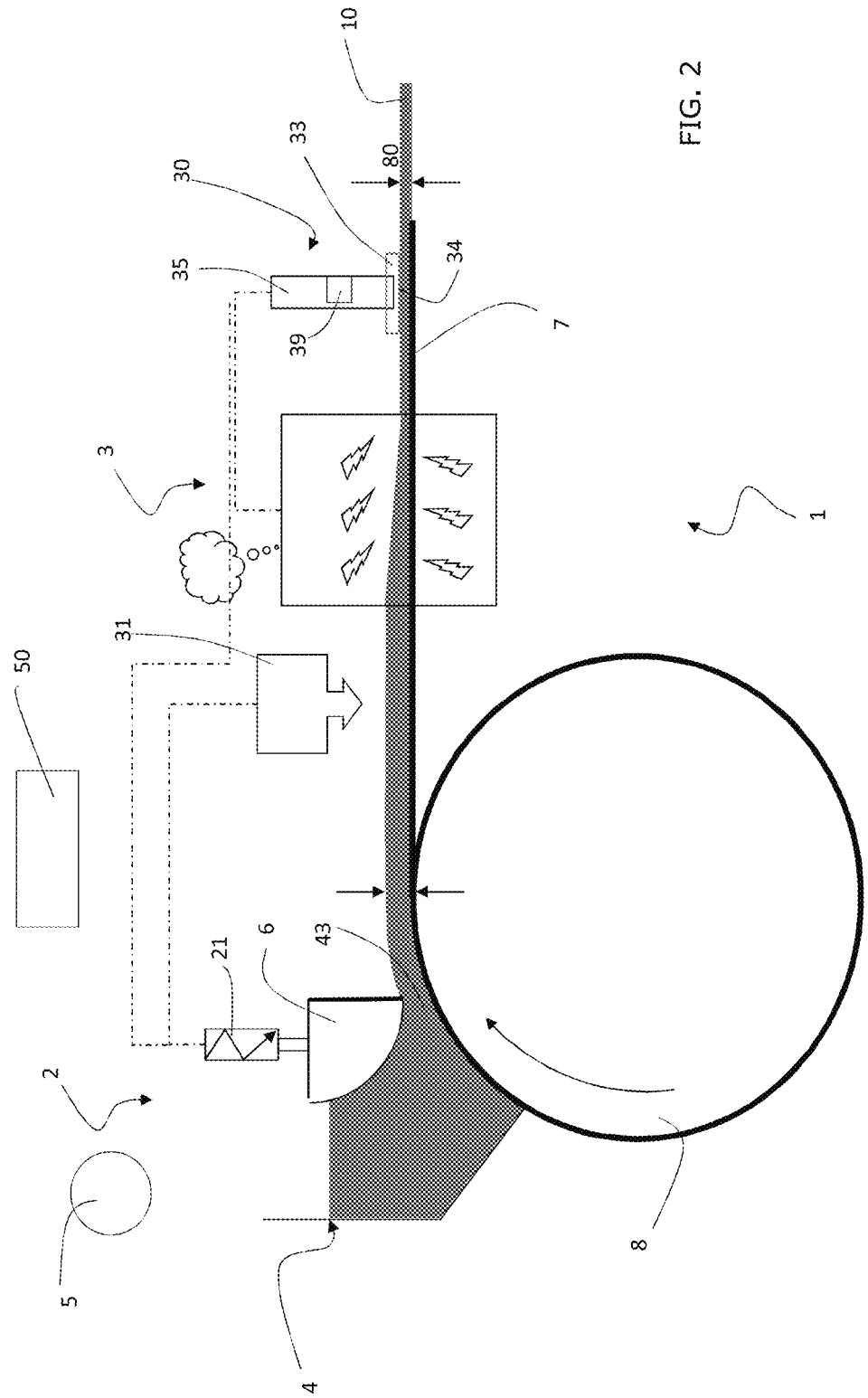
FIG. 2 is a schematic lateral view of an apparatus for the production of a homogenized tobacco sheet including an apparatus for casting the homogenized tobacco sheet according to the invention.

With initial reference to FIG. 2, an apparatus for the production of a sheet 10 of homogenized tobacco material according to the present invention is represented and indicated with reference number 1.

The apparatus 1 for the production of the sheet 10 of homogenized tobacco material includes a casting apparatus 2 realized according to the present invention and further preferably also a drying apparatus or unit 3 positioned downstream the casting apparatus 2 in the direction of motion of the sheet of homogenized tobacco material.

The casting apparatus 2 comprises a casting box 4 where slurry to form the web of homogenized tobacco material is introduced, a pump 5, a casting blade 6 and a movable support 7. Casting box 4 may have any geometrical shape, and in the depicted embodiment it is substantially a prism. The casting box has an opening 43 in correspondence of its bottom and the opening extends along a width of the casting box. Slurry from buffer tanks (not shown in the drawings) is transferred by means of the pump 5 into the casting box. Preferably pump 5 comprises a control (not visible in the drawing) of flow rate to control the amount of slurry introduced in the casting box 4.

Pump 5 is advantageously designed to ensure that slurry transfer times are kept to the minimum necessary.

Further, the casting apparatus 2 includes the casting blade 6 fixed to the casting box 4 in order to cast the slurry. The casting blade 6 has a main dimension which is its width and it is fixed to the casting box 4 at or in proximity of its aperture 43 at the bottom. Preferably, the longitudinal width of the casting blade 6 is between about 40 cm and about 300 cm depending on the desired width of the cast web of slurry. Preferably, such width is adjustable, for example by means of suitable width adjusting means (not visible in the drawings), so that the width of the blade or the active volume of the casting box can be adjusted to the width of the web to be cast. The active volume of the casting box is the volume of the casting box that is actually filled with slurry.

The casting blade 6 is attached to the casting box preferably by means of an adjustable board (not shown in the appended drawings) which allows a precise control of the position of the casting blade 6. The casting box 4 and the casting blade 6 are mounted above a drum 8 which rotates the movable support 7. Between the casting blade 6 and the movable support 7 a gap is present, the dimensions of which determine—among others—the thickness of the cast sheet of homogenized tobacco material. Thus, the dimension of the gap is controlled by controlling the position of the casting blade 6 by means of the adjustable board.

To vary the dimension of the gap in the direction perpendicular to its width, that is to vary the breadth of the gap, a plurality of actuators 21 (only one shown in FIG. 2).

Figure 6:
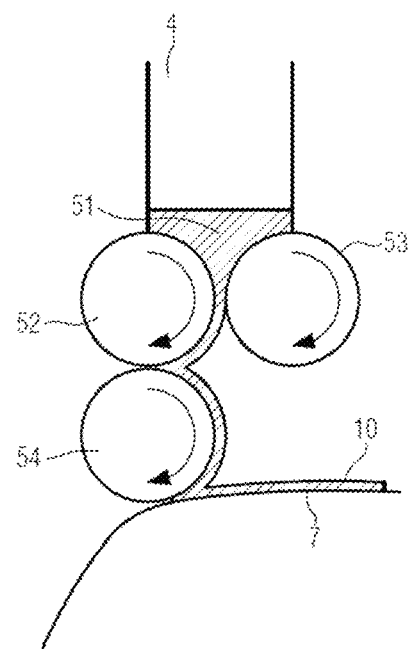
FIG. 6 is a schematic lateral different embodiment of a casting system to be used in the casting apparatus of FIG. 2.

In a different embodiment of the casting apparatus 2, depicted in FIG. 6, casting rollers are used instead of a casting blade. The slurry is collected in the casting box 4 which includes an opening 51 from which slurry by gravity may fall onto a first and a second casting roller 52, 53 substantially parallel to each other and having their axis substantially on the same plane, which is preferably horizontal. The two casting rollers 52, 53 form a gap therebetween, for example equal to about 0.4 millimeters. The two casting rollers 52, 53 are driven into rotation and their speed (they rotate in the same direction) is of about 3.25 meter/minute for the first casting roller and equal to about 1.62 meter/minute in the second casting roller.

The first casting roller is substantially coated by the slurry and it transports the slurry onto a third casting roller 54 located below the first casting roller. The third casting roller also rotates and brings the slurry onto the movable support 7. The speed of rotation of the third casting roller is of about 2.31 meter/minute.

In any of the above embodiments, the casting apparatus 2 also comprises the mobile support 7 on which the slurry is cast to form the sheet 10 of homogenized tobacco material. The mobile support 7 comprises for example a continuous stainless belt 7 comprising a drum assembly. The drum assembly includes the main drum 8 located below the casting box 4 which moves the movable support 7. Preferably, the casting box 4 is mounted on top of the main drum 8. Preferably, the tolerances of the above mounting are very strict, for example within about 0.01 mm. For example, the movable support drum 8 has a tolerance of below about 0.01 mm in concentricity and below about 0.10 mm across its diameter. The movable support 7 has a tolerance preferably below about 0.01 mm.

Figure 1:
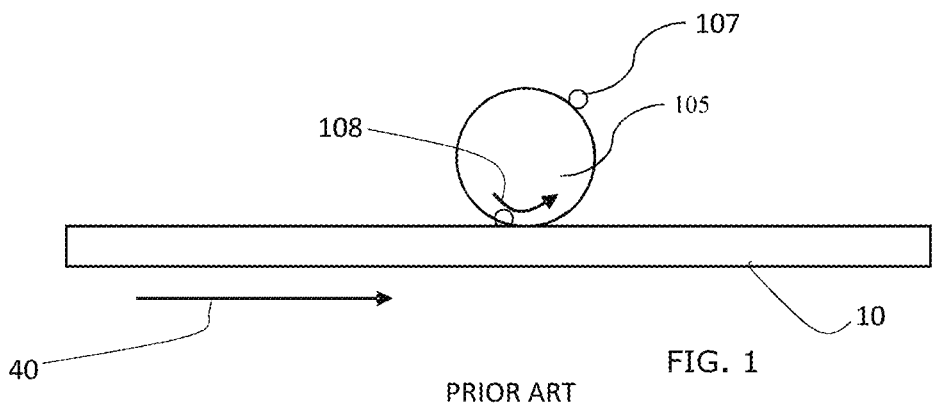
FIG. 1 is a schematic lateral view of a portion of a casting apparatus according to the prior art.
Figure 3:
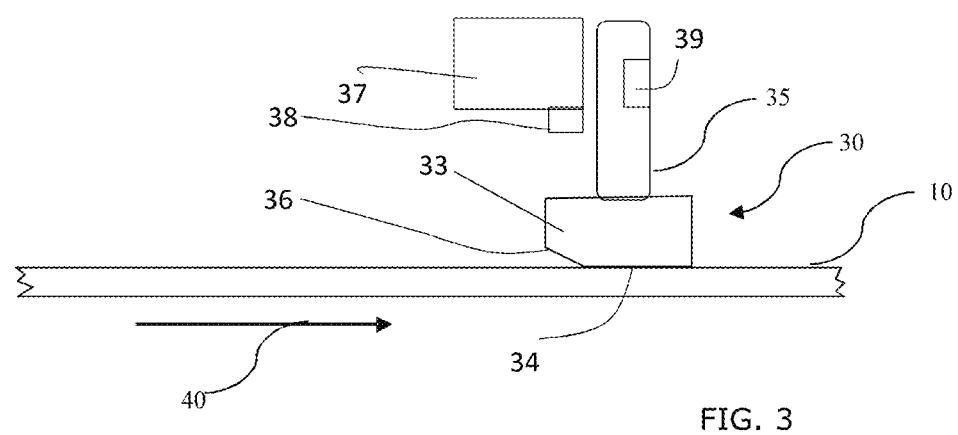
FIG. 3 is a schematic lateral view of a portion of the casting apparatus of FIG. 2.

The movable support shifts the cast sheet 10 along a direction depicted with an arrow 40 in FIG. 3.

Further, with again reference to FIG. 2, the casting apparatus 2 includes a sensor 30 to measure the thickness of the cast sheet 10. The sensor 30 includes a slider 33 having a planar surface 34 (better visible in FIG. 3) and a height detector 39, which is adapted to measure the height of the planar surface 34. The sensor 30 can be raised or lowered towards the cast sheet 7, for example by means of actuators 35. The planar surface 34 has for example a size of about 1.2 square millimeters.

Further, as visible in FIG. 3, slider 33 includes a further planar surface 36, inclined with respect to the planar surface 34, positioned upstream the planar surface 34 in the direction of motion of the movable support 7. The further planar surface 36 is inclined with respect to the planar surface 34 of an angle larger than about 90°. Preferably, this further planar surface 36 is not in contact with the cast sheet 10. In a different non depicted embodiment, the connection between the two planar surfaces is obtained by means of a curved surface.

The apparatus 1 further comprises a compressed air generator 37 (visible in FIG. 3) adapted to eject a steam of compressed air towards the slider 33. The slider is pressed towards the movable support 7 by the compressed air. To achieve it, the generator 37 preferably comprises a nozzle 38 directed towards the slider 33 and properly oriented.

Figure 4:
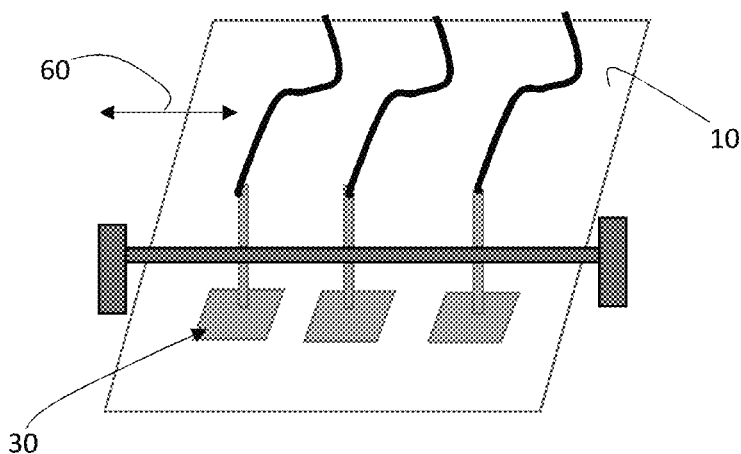
FIG. 4 is a schematic perspective view of a different embodiment of the portion the casting apparatus of FIG. 3.

The apparatus 1 may include a plurality of sensors 30. As depicted in FIG. 4, a plurality of sensors 30 are positioned along a row which is substantially perpendicular to the transport direction 40. The row of sensors is used to determine the thickness of the cast sheet 10 along its whole width. Preferably each sensor of the plurality can vary not only its height via actuator 35, but also its location within the width of the cast sheet, that is, its position in a direction perpendicular to the moving direction of the movable support 7, as depicted by the arrow 60.

Each of the sensors of the plurality 30 is preferably realized as depicted in the enlarged view of FIG. 3. However, differences among the sensors of the plurality can be present as well.

Preferably, the plurality of sensors or the single used sensor 30 is located downstream the drying apparatus 2 in the direction of motion 40 of the cast sheet 10.

Preferably, the sensors of the plurality are placed equidistant from each other, so that they each monitor one portion of the width of the tobacco cast sheet 10.

Further sensors can be provided in the casting apparatus 2, for example a level sensor (not depicted), is adapted to control the height of the slurry within the casting box 4. Further, preferably further sensor 31 is arranged above the movable support 7 to measure the weight per square of the homogenized tobacco layer on the movable support 7. The sensor 31 may be for example a nucleonic measuring head. Additional sensors, not shown in the drawings, are preferably present as well, such as a sensor to locate and determine the positions of defects in the cast web of homogenized tobacco, a sensor to determine the moisture of the slurry and of the cast leaf at casting, and a temperature sensor for determining the temperature of the slurry in the casting box 4.

Preferably, all the sensors send signals relative to their respective parameters to be measured (temperature, moisture slurry level, defects, and so on) to a central control unit 50. Preferably, also sensor or sensors 30 are connected to central unit 50 to send signals relative to the height of the slider 33. Central control unit 50 is preferably electrically connected to one, to some or to all of pump 5, actuators 21 or to further circuits and actuators in the casting apparatus 2 or in a slurry preparation apparatus (not visible). In case the cast sheet reveals defects or inhomogeneity or the characteristics of the cast sheet are outside a preset range, the central control unit 50 can instruct changes in the process parameters and thus influence characteristics of the slurry or the parameters of the casting. These process parameters may be for example the dimension of the gap between the casting blade 6 and the support 7 or the amount of slurry in the casting box. For example, a feedback loop to the actuators 20 of the casting blade 6 is present to adjust the thickness of the cast web.

The drying apparatus 3 preferably includes a plurality of individual drying zones. Each drying zone preferably includes steam heating on the bottom side of the support and heated air above the movable support 7 and preferably also adjustable exhaust air control. Within the drying apparatus 3, the homogenized tobacco web is dried to desired final moisture on the support 7.

Figure 5:
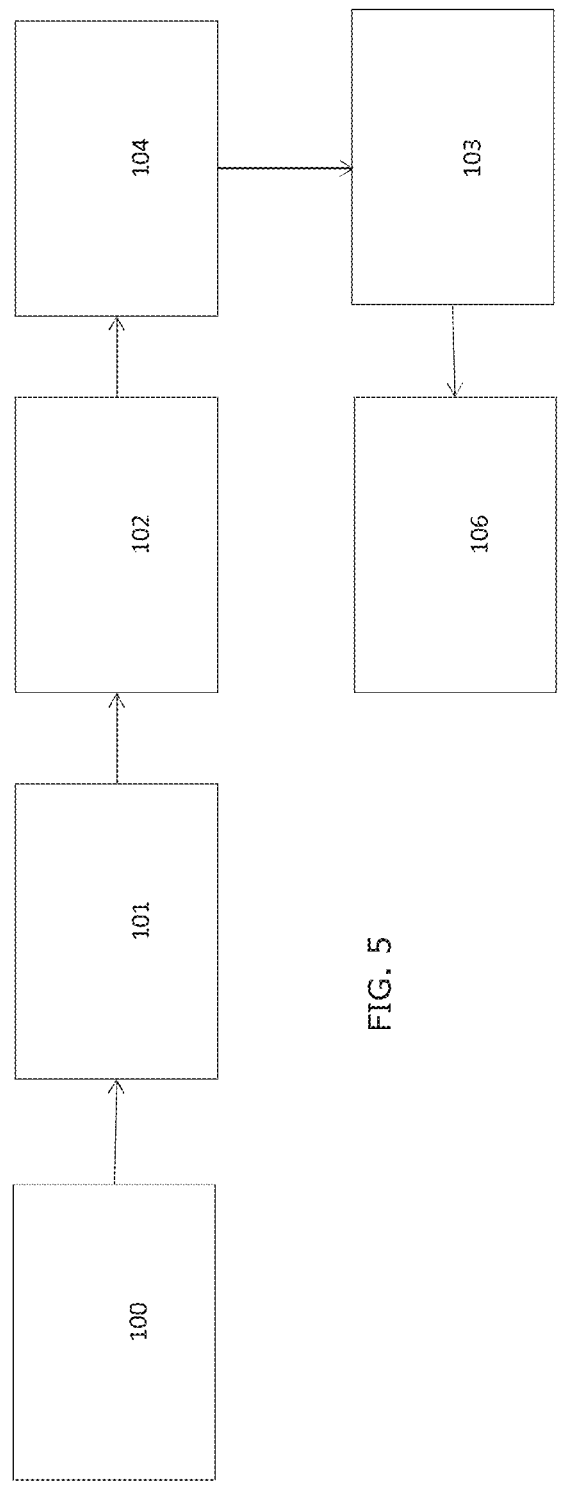
FIG. 5 is a flow diagram of a method of measuring the thickness a homogenized tobacco sheet using the method of the invention.

With now reference to FIG. 5, the functioning of the apparatus 1 including the casting apparatus 2 is as follows. A slurry, formed preferably mixing and combining tobacco powder and other ingredients, is transferred from a holding tank (not shown) using for example in line mixers (also not shown) to the casting apparatus 2 inside the casting box 4. The step 100 of casting of the slurry into a sheet of desirably homogenous and uniform film thickness is performed on the movable support 7, for example the stainless steel belt 7. The casting step 100 includes transferring the slurry from the mixing tank to the casting box 4. Further, it preferably includes monitoring the level of slurry in the casting box 4, the moisture of the slurry inside the casting box 4, and the density of the slurry, by means of suitable sensors.

The casting is performed by means of casting blade 6 or the casting rollers 52-54 forming a gap with the movable support 7, gap that can also be feedback controlled.

Further, the cast web undergoes a drying step 101 by means of the drying apparatus 3. The drying step includes preferably a uniform and gentle drying of the cast web in an endless, stainless steel belt dryer with individually controllable zones. During the drying, a monitoring step 102 of the cast web temperature at each drying zone to ensure a gentle drying profile at each drying zone is preferably performed. The cast web is dried to desired final moisture on the steel belt 7 with steam pan heating from bottom and top air drying. Every drying zone is equipped with steam flow and pressure control and air temperature and air flow are fully adjustable to provide the desired drying profile and ensuring product residence time is respected. Also the drying profile, that is all characteristics of the drying, can be feedback controlled depending on the measurements of the thickness of the cast sheet.

Preferably, at the end of the casting step 100 and of the drying step 101, the homogenized tobacco web is removed from the support 7. Doctoring 103 of the cast web after the drying station at the right moisture content is preferably performed. The cast web goes preferably through a secondary drying process 104 to remove further moisture content of the cast sheet 10.

Before the doctoring step 103, and preferably after the drying step 101, preferably a step 104 of measurement of the thickness of the sheet 10 of homogenized tobacco material is performed. Preferably the thickness of the sheet is continuously monitored and feedback-controlled using sensor 30 or the plurality of sensors 30.

Sensor 30 is moved into contact with a top surface of the cast sheet 10 in order to measure its thickness 80 (see FIG. 2). The planar surface 34 comes into contact with the top surface of the cast sheet due to movements of the actuator 35. Also the position of the planar surface 34 onto the top surface of the cast sheet 10 can be varied, that is, the position of the planar surface 34 along the width of the sheet can be varied as well, as depicted by arrow 60 of FIG. 4.

A pressure is applied onto the cast sheet 10 by means of the planar surface 34 due to ejection of compressed air from the generator 37. The generator 37 ejects, through the nozzle 38, air having a given pressure which is set according to characteristics of the cast sheet. For example, control unit 50 may send a command to the generator 37 to set the proper pressure value depending on the inputted characteristics of the cast sheet.

For example, the area of the planar surface could be of about 3 square centimeters applying a force between about 1 and 2 Newton to the cast sheet 10.

The height of the planar surface 34 is then detected. From the detected height, an initial height is subtracted, the initial height being the height of the planar surface when in contact to the movable support 7. This subtraction is preferably performed in the control unit 50, to which height signals are preferably sent by sensor 30. The result of the subtraction gives the thickness 80 of the cast sheet 10.

In the control unit 50 preferably a comparison is made between the detected thickness 80 of the cast sheet 10 and a preferred value, or range of values, of the thickness of the cast sheet 10.

A feedback step 106 may then follow the measurement step 104. In the feedback step, the control unit 50 may send signals to motor or actuators to change parameters of the slurry formation or of the slurry casting step. The feedback step 106 is preferably performed in case the measured thickness of the cast sheet 10 is outside the desired range or it is not uniform. For example, if two different sensors 30 of the plurality depicted in FIG. 4 detect different thicknesses, then a non-uniform thickness is present. Further, the feedback step 60 may be performed also if monotonic variations in the cast sheet thickness are detected, even before the resulting thickness 80 is outside the desired range.

Further, preferably the feedback step 106 is performed in-line, that is, the parameters to be changed in order to obtain either a thickness 80 within the desired range or a uniformly thick cast sheet 10 are varied during production.

The invention claimed is:

1. A method to check a thickness of a cast sheet of a homogenized tobacco material, the method including:
    introducing a slurry of homogenized tobacco material in a casting box;
    casting the slurry on a movable support forming a cast sheet;
    putting a slider having a planar surface in contact to a top surface of the cast sheet;
    detecting a height of the planar surface of the slider by a height detector disposed on the slider; and
    deriving from the detected height a thickness of the cast sheet.

2. The method according to claim 1, including pressing the planar surface against the top surface of the cast sheet.

3. The method according to claim 2, wherein said pressing is performed by applying pressurized air on the slider.

4. The method according to claim 2, including the step of tuning an applied pressure value by the planar surface onto the top surface of the cast sheet.

5. The method according to claim 4, wherein a value of said pressure in said tuning depends on parameters of the composition of the cast sheet.

6. The method according to claim 1, wherein the casting of the slurry is performed by means of a casting blade, a distance between the casting blade and the movable support being changeable.

7. The method according to claim 1 wherein the casting of the slurry is performed by means of two casting rollers, a gap between the two casting rollers being changeable.

8. The method according to claim 1, including the steps of:
    preparing a slurry;
    detecting variations of the height of the slider; and
    changing parameters of the step of casting the slurry or in the step of preparing the slurry or in a step of processing the cast sheet if the detected variations are outside a pre-set interval.

9. The method according to claim 8, the step of changing parameters of the step of casting the slurry or in the step of preparing the slurry or in a step of processing the cast sheet includes one or more of:
    changing a gap between two casting rollers, the two casting rollers preforming the step of casting the slurry;
    changing a distance between a casting blade and the movable support;
    changing a speed of at least one of the casting rollers;
    changing a speed of the movable support; and
    changing a drying profile of the cast sheet.

10. The method according to claim 1, including the steps of:
    moving said movable support and said cast sheet along a transport direction, while keeping the slider substantially still.

11. The method according to claim 1, including the steps of:
    drying the cast sheet; and
    detecting a height of the planar surface of the slider after drying.

12. The method according to claim 1, wherein the casting of the slurry is performed by a casting blade, and wherein the slider is spaced apart from the casting blade.

13. The method according to claim 1, wherein the casting of the slurry is performed by a casting blade, and wherein the slider is positioned downstream from the casting blade in a direction of flow of the cast sheet.

* * * * *